United States Patent [19]

Evans et al.

[11] Patent Number: 5,272,563
[45] Date of Patent: Dec. 21, 1993

[54] CAR HEAD-UP DISPLAYS INCLUDING AN ADJUSTABLE PLANE MIRROR LENSLESS NON-DIFFRACTIVE

[75] Inventors: Robert W. Evans, Burscough; Robin A. Merryweather, St. Helens; Andrew P. Ramsbottom, Bolton; Stuart W. Robb, Southport, all of United Kingdom

[73] Assignee: Pilkington plc, United Kingdom

[21] Appl. No.: 789,322

[22] Filed: Nov. 8, 1991

[30] Foreign Application Priority Data

Nov. 10, 1990 [GB] United Kingdom ............... 9024484

[51] Int. Cl.⁵ .......................................... G02B 27/14
[52] U.S. Cl. .................................... 359/631; 359/633
[58] Field of Search ................ 359/631, 630, 633, 629

[56] References Cited

U.S. PATENT DOCUMENTS 3,748,020 7/1973 Fischer et al.
4,600,271 7/1986 Boyer et al.
5,033,818 7/1991 Barr ..................................... 359/630

FOREIGN PATENT DOCUMENTS 0011024  5/1980  European Pat. Off.
0352153  1/1990  European Pat. Off.
0391231 10/1990  European Pat. Off.
1944211  9/1970  Fed. Rep. of Germany.
3347271  7/1985  Fed. Rep. of Germany.
 701396 12/1953  United Kingdom.
1418891A 12/1975  United Kingdom.

Primary Examiner—Jon W. Henry
Attorney, Agent, or Firm—Burns, Doane, Swecker & Mathis

[57] ABSTRACT

A car head-up display projection unit has a substantially spherical concave mirror providing the optical power and which receives light at near axial incidence from a display source and reflects that light to an adjustable substantially plane mirror. Light from the projection unit is reflected from the car windshield to the driver's eyes.

12 Claims, 3 Drawing Sheets

CAR HEAD-UP DISPLAYS INCLUDING AN ADJUSTABLE PLANE MIRROR LENSLESS NON-DIFFRACTIVE

BACKGROUND OF THE INVENTION

This invention concerns improvements in or relating to car head-up displays and more particularly to projection units for such displays.

There have been numerous proposals for car head-up display systems of varying complexity and practicality. Many proposals have employed projection optics with refractive lenses and/or diffractive elements to give high image quality but these can tend to make the system bulky or expensive. Also systems which give excellent imagery for one particular design position can sometimes suffer rapid deterioration on departure from that design position, particularly when off-axis optics are involved. European Patent Application EP 0 391 231A discloses a particular example having an off-axis aspheric mirror which is tiltably adjustable.

SUMMARY OF THE INVENTION

According to the present invention there is provided a lensless, non-diffractive projection unit for a car head-up display, the projection unit comprising a housing, a display source mounted in the housing, a substantially spherical concave mirror mounted in the housing, which concave mirror provides the optical power of the projection unit and is disposed to receive light from the display source at substantially axial or near axial incidence, and a substantially plane mirror mounted in the housing and disposed out of the light path from the display source to the concave mirror to receive such light reflected from the concave mirror and for reflecting that light towards a desired location, the mounting of the substantially plane mirror being such as to permit adjustment to reflect the light towards the desired location. Such a projection unit can provide an adequate image quality which can, by adjustment of the substantially plane mirror, be viewed over a range of positions accommodating different individual driver eye positions.

The substantially plane mirror, which is preferably a front surface mirror, is preferably mounted for angular movement so that its tilt can be adjusted about an axis preferably fixed with respect to the housing. The display source and the concave mirror, which is also preferably a front surface mirror, are preferably mounted at permanently fixed positions in the housing. In order to achieve compactness consistent with two eyed viewing, the substantially plane mirror is preferably of substantially rectangular shape and the concave mirror is also preferably substantially rectangular, e.g. a truncated circle, in shape so that there is a larger field of view in azimuth than in elevation.

The substantially plane mirror may be disposed above or below the light path from the display source to the concave mirror, the concave mirror preferably being fully reflecting and slightly tilted with respect to the direction of travel of light from the display source so as to reflect that light towards the substantially plane mirror.

The housing preferably has a transparent window through which light reflected from the substantially plane mirror, i.e. the light projected by the unit, passes and may be hermetically sealed.

The present invention further provides a car head-up display comprising a projection unit as set forth above and a windscreen which directs light projected by the projection unit towards the car driver's eyes to superimpose an image of the display on his forward view through the windscreen. The windscreen may, but need not necessarily, have a reflective patch which reflects, or a hologram or other diffractive element which diffracts, light projected by the projection unit towards the car driver's eyes.

BRIEF DESCRIPTION OF THE DRAWINGS

In order that the invention may be better understood, apparatus in accordance with it will now be described, by way of example, with reference to the accompanying drawings, in which.

DETAILED DESCRIPTION OF THE PREFERRED EMBODIMENTS

Figure 1:
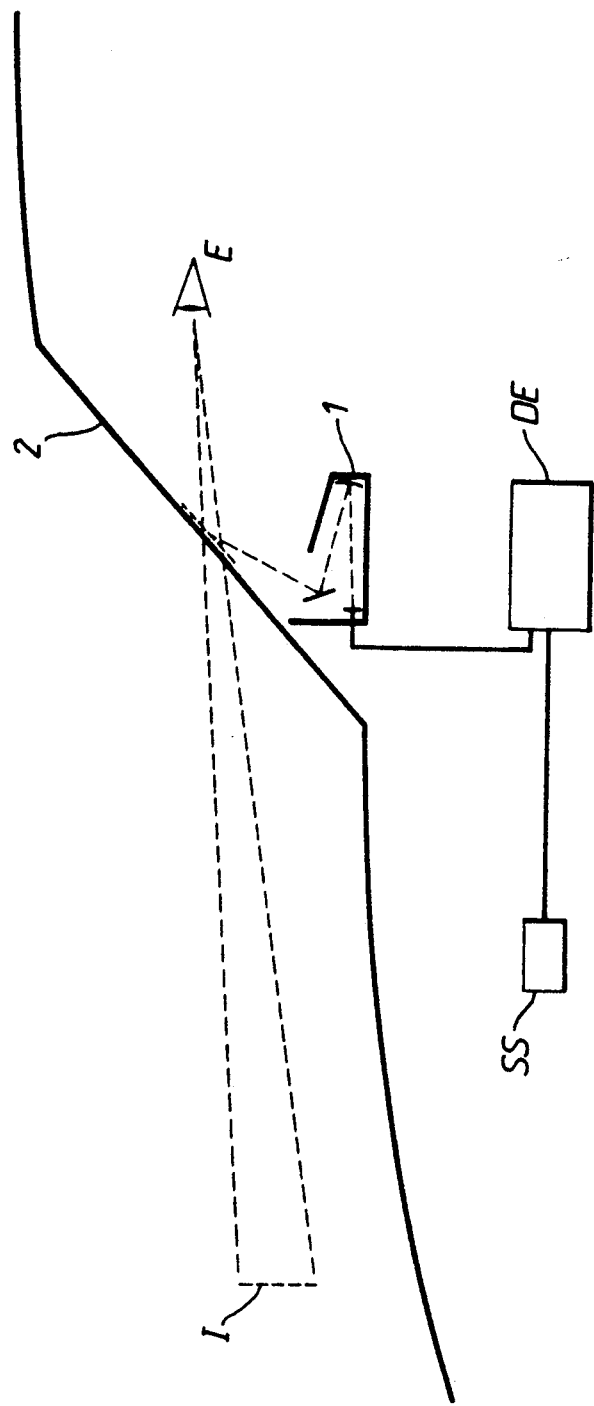
FIG. 1 is a schematic representation of a car head-up display.

FIG. 1 schematically shows a car head-up display projection unit 1 which projects a light beam carrying visual information to be displayed to the car driver upwardly towards the car windscreen 2 from which it is reflected towards the driver's eyes E. Reflection from the windscreen may be simply by the material of the windscreen, usually glass, or may be enhanced by a suitably coated reflective patch, or by a diffractive element, e.g. a hologram contained in a laminated windscreen. With a broad spectral bandwidth display reflection from the windscreen material or from a wide spectral bandwidth or neutral reflective patch may be appropriate but with a narrow spectral bandwidth display a diffractive element or wavelength selective reflective patch may be desirable. By means of the reflected light the driver sees a visual image I of the visual information superimposed on his forward view through the windscreen, the distance of the image I beyond the windscreen being dependent on the optical power of the projection unit 1. The displayed information may be in any suitable desired form, for example a digital speed display. FIG. 1 indicates a speed sensor SS and drive electronics DE connected with a display source in the projection unit 1.

Figure 2:
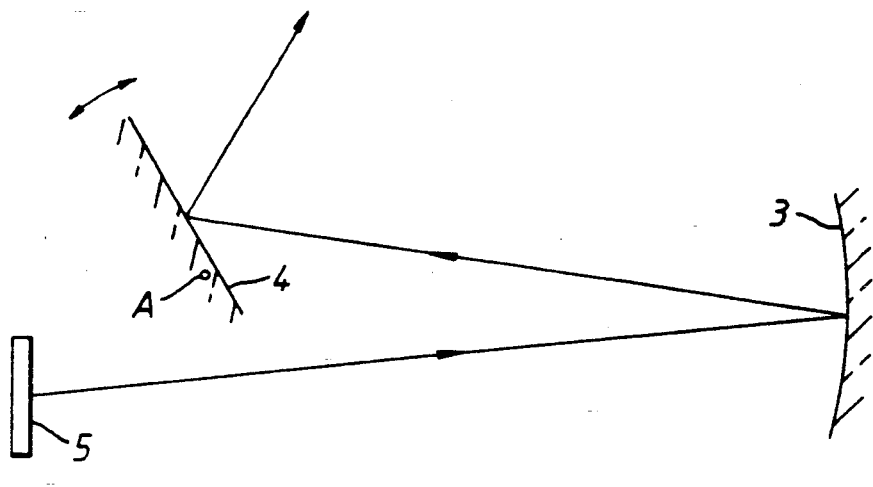
FIG. 2 is a schematic representation of the optical components of one embodiment of projection unit.
Figure 3:
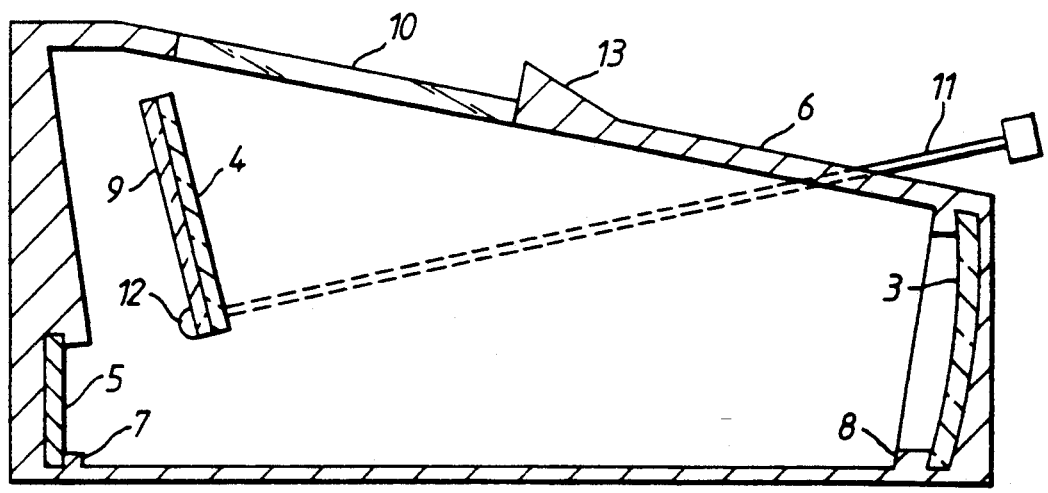
FIG. 3 is a diagrammatic longitudinal section through the projection unit of FIG. 2.

FIGS. 2 and 3 schematically show one embodiment of projection unit 1 in accordance with the present invention. Its basic optics are indicated in FIG. 2 and consist of a fixed fully reflecting concave mirror 3 and a fully reflecting plane mirror 4 whose angle of tilt can be adjusted about an axis A substantially in the plane of the mirror 4, i.e. lying orthogonal to the plane of the drawing. Light from a fixed display source 5 travels towards the concave mirror 3 which it strikes at substantially axial or near axial incidence. Preferably the concave mirror 3 is at an angle of tilt of less than 18° with respect to the optical axis from the display source 5 (i.e. an axial light ray from the centre of the display source 5 strikes the mirror 3 at an angle of incidence of less than 18° to the mirror axis, the ray reflected from the mirror 3 being at twice that angle to the incident ray). Ideally the angle of tilt of the concave mirror 3 (i.e. the angle between its axis and the optical axis from the display source 5) is less than 10° and typically may be about 6°. The plane mirror 4 is out of the light path from the display source 5 to the concave mirror 3 and light is reflected from the concave mirror 3 towards the plane mirror 4 from which it is then reflected to travel upwardly. By adjusting the tilt of the plane mirror 4 the precise direction in which the light is reflected can be adjusted so that the light travels towards a desired location, i.e. towards the driver's eyes after reflection from the windscreen. By means of this adjustment different driver eye heights can be accommodated. The concave mirror 3 provides the optical power of the unit, its curvature and distance from the display source 5 determining the distance (and magnification) of the displayed image viewed by the driver. The plane mirror 4 is of rectangular shape (with the longer dimension orthogonal to the plane of FIG. 2) and the concave mirror 3 is of truncated circular shape (i.e. with the upper and lower portions of the circle removed) approximating to a rectangle. This provides a larger field of view in azimuth than in elevation appropriate to two eyed viewing. Such truncated circular shape of the concave mirror 3 may be convenient for use of stock optical components but this mirror may be made more rectangular if required.

FIG. 3 illustrates the mechanical arrangement comprising a housing 6 having at its front end a mounting 7 for the display source 5 and at its back end a mounting 8 for the concave mirror 3. The mountings 7 and 8 are such as to hold the display source 5 and the concave mirror 3 in a fixed positional relationship, i.e. a fixed distance apart and with the concave mirror slightly angled so as to reflect light slightly upwardly but so that the light from the display source still strikes the concave mirror at quasi-axial incidence. Towards the front of the housing 6 is a mounting 9 for the plane mirror 4 located so that the plane mirror is held above the light path from the display source 5 to the concave mirror 3. The mounting 9 is such as to permit angular adjustment of the plane mirror 4 as previously described about an axis fixed with respect to the housing. The housing 6 contains the display source 5 and mirrors 3 and 4 within it and has a transparent window 10 through which light reflected from the plane mirror 4 passes. A lever 11 disposed externally of the housing 6 but connected with the mounting 9 through a bearing 12 in a wall of the housing 6 is provided so that the angle of tilt of the plane mirror 4 can be adjusted manually by the driver moving the lever 11 to locate the displayed image I suitably for his eye position. The window 10 may be shaped to minimise unwanted reflections and the housing 6 may have a lip 13 to prevent direct viewing of the window 10 by the driver (who might otherwise find such view distracting).

The embodiment shown in FIGS. 4 and 5 differs from that shown in FIGS. 2 and 3 in that the plane mirror 4 is disposed below the light path between the display source 5 and the concave mirror 3. It will be understood that with this arrangement the concave mirror 3 is slightly angled or tilted downwardly to reflect the light towards the plane mirror 4. In some circumstances the lower location of the plane mirror 4, as in the FIGS. 4 and 5 embodiment, can be advantageous in further reducing possibly distracting direct view of the plane mirror 4.

Figure 4:
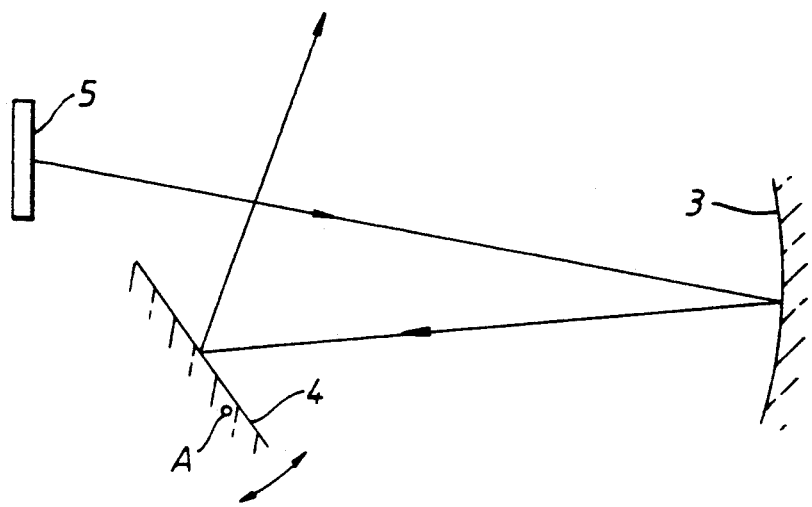
FIG. 4 is a schematic representation of the optical components of another embodiment of projection unit.
Figure 5:
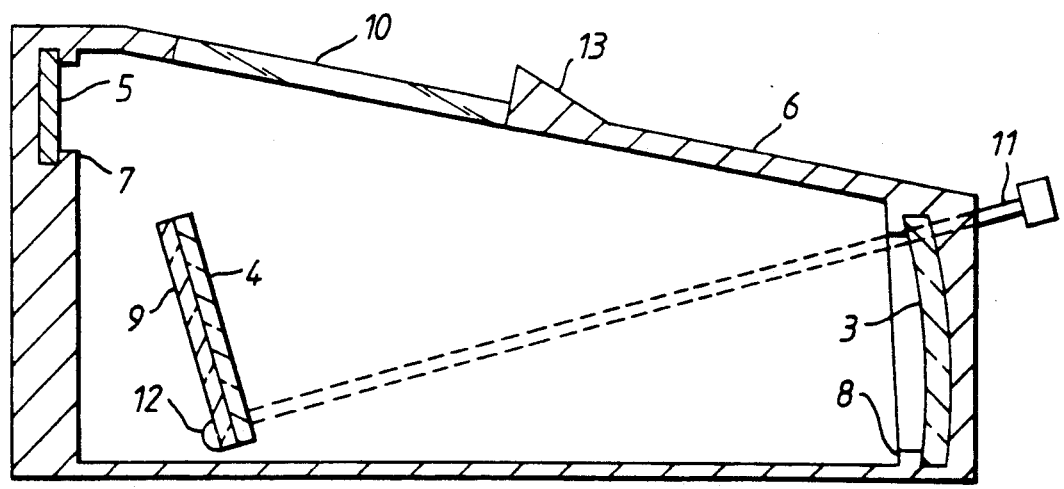
FIG. 5 is a diagrammatic longitudinal section through the projection unit of FIG. 4.

In the FIGS. 4 and 5 embodiment the display source 5 and substantially rectangular concave mirror 3 are fixedly held in a housing 6 by suitable mountings 7 and 8 respectively while the rectangular plane mirror 4 has a mounting 9 permitting angular adjustment by means of a lever 11 as previously described in relation to the FIGS. 2 and 3 embodiment, the housing similarly having a transparent window 10 for passage of light reflected from the plane mirror 4. Again the window 10 may be shaped to reduce unwanted reflections and the upper face of the housing may have a lip 13 to restrict direct view.

In both embodiments the housing 6, which may be of moulded plastic, may be hermetically sealed and filled with a dry gas such as nitrogen and/or may incorporate electrical heating means in order to prevent misting up of the mirrors 3 and 4 and the window 10. It will be understood also that adjustment of the plane mirror 4 could be motorised, e.g. with the driver pressing a button to effect electrically driven movement.

The concave mirror 3 is preferably a front surface mirror preferably of spherical curvature although it may be slightly aspheric, for example up to about 0.5 dioptre. It is of relatively short focal length, e.g. 160 mm with a maximum aperture of 63 mm, in order to impart reasonable optical power to the unit but, since the incident light from the display source 5 strikes it at substantially axial or near-axial incidence, it does not distort the eventual image I unacceptably even in combination with the action of the windscreen 2.

The plane mirror 4 is also preferably a front surface mirror and, although ideally truly planar, it may have some slight curvature (spherical or slightly aspheric), for example up to about 0.5 dioptre.

The display source may be of any suitable type which is small enough, for example a vacuum fluorescent display, which may be connected with drive electronics DE as previously mentioned with reference to FIG. 1. The effectiveness of the display (particularly for use in sunlight) may be improved by appropriate application of contrast enhancement filters.

In the embodiments specifically described above, the display source 5 and concave mirror 3 are mounted at permanently fixed positions in the housing 6 so that they are held a fixed distance, e.g. 150 mm, apart, thereby locating the eventual display image I at a particular distance, e.g. 2 meters, beyond the windscreen 2. There could, however, be provision for adjustment of one or both of these elements towards and away from the other. This would give the facility for altering their distance apart and hence the distance of the eventual display image I. The distance of the image I beyond the windscreen 2 is desirably between about 2 meters and 10 meters. The nearer it is the less is the effect of the windscreen on degrading the perceived image although double imaging effects arising from reflection at two windscreen surfaces may be increased.

Although the preferred manner of adjustment of the plane mirror 4 is angular as described above so that it can be tilted about an axis fixed with respect to the housing, it could alternatively or additionally be mounted for translational movement along the housing 6, thereby changing the position at which the projected light strikes the windscreen 2 and hence the position of the displayed image I viewed by the driver. Adjustment of the plane mirror may, as mentioned above, be motorised, and could also be responsive to movement of some other part of the car, for example raising and lowering of the driver's seat.

It will be seen that a lensless, non-diffractive projection unit whose optical components, other than the display source, consist only of two mirrors as described above can be relatively compact, such that it can readily fit in or on a car dashboard, and can be relatively simple and lightweight. Further, it can be used with a variety of different windscreen types and shapes to provide an acceptable car head-up display system.

What is claimed is:

1. A lensless, non-diffractive projection unit for a car head-up display, the projection unit comprising a housing, a display source mounted in the housing, a substantially spherical concave mirror mounted in the housing which concave mirror provides the optical power of the projection unit and is disposed to receive light from the display source at substantially axial or near-axial incidence, and a substantially plane mirror mounted in the housing and disposed out of the light path from the display source to the concave mirror to receive such light reflected from the concave mirror and for reflecting that light towards a desired location, the mounting of the substantially plane mirror being such as to permit adjustment to reflect said light towards said desired location.

2. A projection unit according to claim 1 in which the substantially plane mirror is mounted for angular movement.

3. A projection unit according to claim 1 in which the display source and the concave mirror are mounted at permanently fixed positions in the housing.

4. A projection unit according to claim 1 in which the concave mirror is a front-surface mirror.

5. A projection unit according to claim 1 in which the substantially plane mirror is a front surface mirror.

6. A projection unit according to claim 1 in which the substantially plane mirror and the concave mirror are of substantially rectangular shape thereby providing a larger field of view in azimuth than in elevation.

7. A projection unit according to claim 1, in which the substantially plane mirror is disposed so that the light reflected towards the desired location does not intersect with the light path from the display source to the concave mirror.

8. A projection unit according to claim 1, in which the substantially plane mirror is disposed so that the light reflected toward the desired location crosses the light path from the display source to the concave mirror.

9. A projection unit according to claim 1 in which the housing has a transparent window through which light reflected from the substantially plane mirror passes.

10. A car head-up display comprising a projection unit according to claim 1 and a windscreen which directs light projected by the projection unit towards the car driver's eyes to superimpose an image of the display on his forward view.

11. The apparatus of claim 10, wherein the substantially plane mirror is mounted for angular movement in response to a member which is manually adjustable by the driver to reflect the displayed image onto the car windscreen at a location suitable for the driver's eye position.

12. A lensless, non-diffractive projection unit for a car head-up display, the projection unit comprising a housing, a display source mounted in the housing, a substantially spherical concave mirror mounted in the housing, the concave mirror providing the optical power of the projection unit and being disposed to receive light from the display source at substantially axial or near-axial incidence, a substantially plane mirror mounted in the housing and disposed out of the light path from the display source to the concave mirror to receive light reflected from the concave mirror and for reflecting that light towards a desired location, the substantially plane mirror being movably mounted within the housing to permit adjustment of a tilt angle of the substantially plane mirror so that light can be reflected towards said desired location.

* * * * *